May 18, 1926. 1,585,422
H. R. SEIFERT
PISTON RING
Filed Nov. 22, 1922
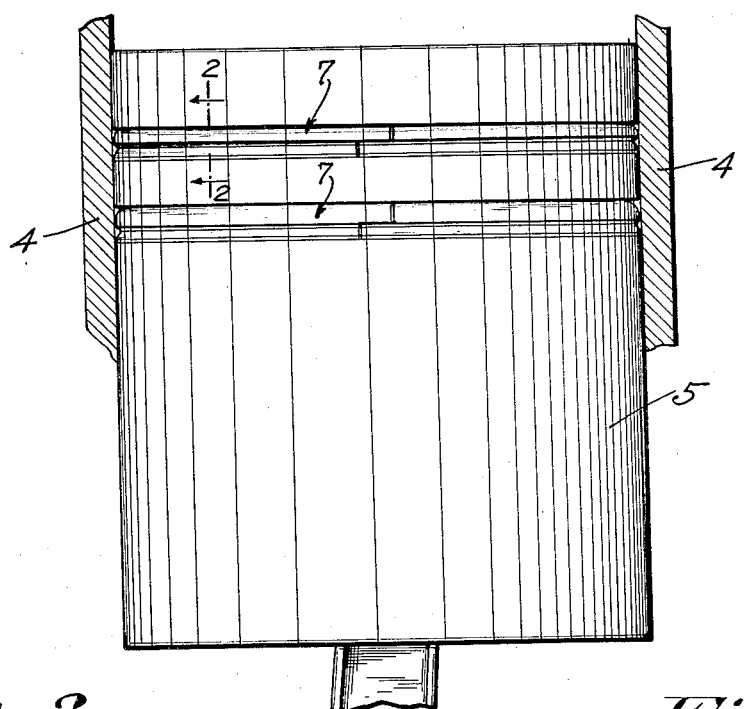
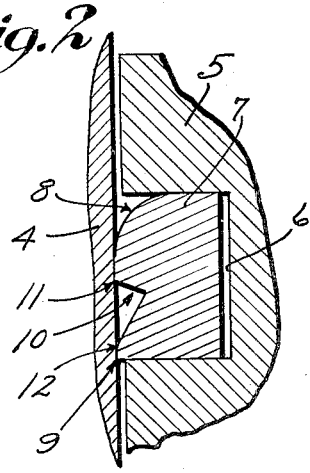
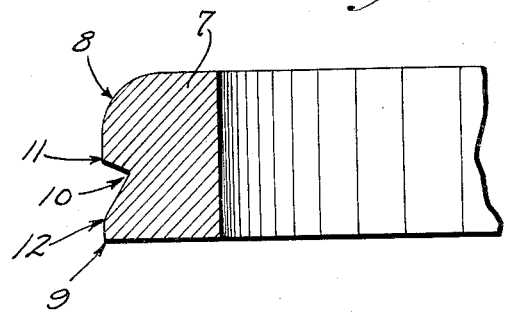
Inventor
Henry R. Seifert
By his Attorneys
Merchant and Kiegore Patented May 18, 1926.

1,585,422

UNITED STATES PATENT OFFICE.

HENRY R. SEIFERT, OF EAST ELLSWORTH, WISCONSIN.

PISTON RING.

Application filed November 22, 1922. Serial No. 602,537.

My present invention relates to piston rings and more particularly to such rings having oil-sealing grooves, and has for its object to provide an extremely simple and highly efficient piston ring designed to prevent a piston to which it is applied from pumping oil.

To the above end, the invention consists of the novel construction and arrangement of parts hereinafter described and defined in the claim.

In the accompanying drawings, which illustrate the invention, like characters indicate like parts throughout the several views.

Referring to the drawings:

Fig. 1 is a fragmentary view partly in section and partly in side elevation illustrating one of the cylinders and pistons of an internal combustion engine, and which piston is equipped with two of the improved piston rings;

Fig. 2 is a detail view in section taken on the line 2—2 of Fig. 1, on an enlarged scale; and Fig. 3 is a fragmentary detail view of the piston ring shown in Fig. 2 removed from the piston.

The numerals 4 and 5 indicate, respectively, one of the cylinders and pistons of an internal combustion engine, and which piston is provided with two customary piston ring grooves 6, in each of which is mounted a circumferentially expansible and contractible piston ring 7 made in accordance with my invention.

The upper edge of the piston ring 7 is curved as indicated at 8, and the lower edge thereof is sharp as indicated at 9. Formed in the outer face of the piston ring 7 is a circumferential oil-sealing groove 10 which, as shown, is V-shaped in cross section, and the lower wall thereof has a greater divergence than the upper wall thereof.

The purpose of thus forming the walls of the oil-sealing groove 10 is to give the piston ring 7, at the upper wall of said groove, a sharp edge 11. The lower wall of the oil-sealing groove 10 is curved into the outer face of the piston ring 7, as indicated at 12.

During the up stroke of the piston 5, the curved edges 8 and 12 will ride over the oil on the walls of the cylinder 4; and during the down stroke of said piston, the sharp edges 9 and 11 will carry the oil downward therewith, and the latter of said edges will cause the oil carried thereby to fill the oil-sealing groove 10 and thereby tightly seal the joint between the piston and cylinder.

From the above description it is evident that the curved edges on the piston ring will slide over more oil than the sharp edges, and hence prevent the accumulation of oil on the walls of a cylinder which would result in the pumping of oil by the piston.

What I claim is:

A piston ring having a curved upper edge and a sharp lower edge and also having a V-shaped oil-sealing groove, the lower wall of which has a greater divergence than the upper wall thereof, said groove having a sharp upper edge and a curved lower edge, and said ring both above and below said groove having true cylindrical surfaces that determine the full external diameter of the ring.

In testimony whereof I affix my signature.

HENRY R. SEIFERT.